April 29, 1941.    H. W. CASEY    2,240,011
POWER PLANT
Filed Oct. 26, 1939
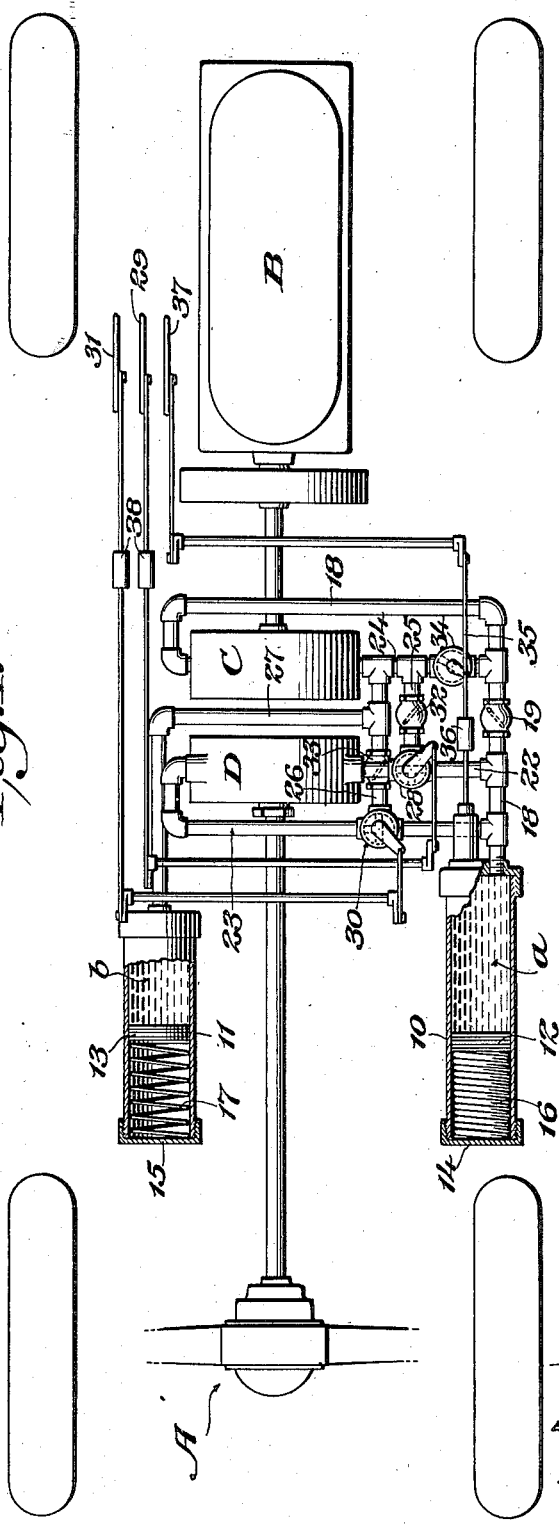
Inventor
*Hilton W. Casey,*
BY
*Wolhaupter & Groff*
Attorneys Patented Apr. 29, 1941

2,240,011

UNITED STATES PATENT OFFICE 2,240,011

POWER PLANT

Hilton W. Casey, Boothwyn, Pa., assignor of fifty one-hundredths to Edward Margolin, and twenty one-hundredths to Aaron Tollin, both of Chester, Pa.

Application October 26, 1939, Serial No. 301,505

2 Claims. (Cl. 60—53)

This invention relates to power plants of the type comprising an internal combustion engine as a power unit and a hydraulic system through which the engine power is transmitted to the part or parts to be driven.

Generally speaking, the primary object of the invention is to provide a hydraulic power transmitting system to adapt internal combustion engines of the Diesel type for the operation of motor vehicles.

Motor vehicles must be capable of being started either slowly or quickly and operated at extremely high and extremely low speeds and of having their speeds suddenly accelerated and decelerated. Accordingly, the power plant of a motor vehicle must be quite flexible in its operation. Gasoline engines are quite flexible in operation and therefore are well suited for the operation of motor vehicles, but gasoline engines do not possess the efficiency of engines of the Diesel type. On the other hand, engines of the Diesel type do not possess the flexibility in operation of engines of the gasoline type. In other words, engines of the Diesel type are incapable of being operated at the extremely high and the extremely low speeds of gasoline engines and of having their speeds suddenly varied and, therefore, are incapable of being successfully used in the same manner as gasoline engines for the operation of motor vehicles. Yet, for the sake of economy in operation and for various other reasons it is very desirable to employ Diesel engines for the operation of motor vehicles. Accordingly, the primary object of the invention, more particularly stated, is to provide a hydraulic system to permit the use of Diesel engines as the power plants of motor vehicles and, at the same time, to afford even greater flexibility in the operation of the vehicles than is afforded by gasoline engines which transmit their power through the usual, well known mechanical transmission gear systems.

Another object of the invention is to provide a hydraulic power transmission system as stated which is simple and inexpensive, easily installed in motor vehicles and thoroughly reliable and efficient in operation.

With the foregoing and other objects in view, which will become more fully apparent as the nature of the invention is better understood, the same consists in the novel combination and arrangement of elements as will be hereinafter more fully described, illustrated in the accompanying drawing and defined in the appended claims.

In the accompanying drawing, wherein like characters of reference denote corresponding parts in the different views—

Figure 1 is a diagrammatic plan view of a motor vehicle equipped with a hydraulic power transmission system constructed in accordance with one practical embodiment of the invention, parts of the system being shown in section; and Figure 2 is a sectional view of the fluid motor comprising part of the hydraulic system.

Referring to the drawing in detail, A designates, generally a motor vehicle, B designates, generally, the power unit of said vehicle in the form of a Diesel engine, C designates, generally, a pump of any suitable type connected in any suitable manner with the engine B to be driven by said engine, and D designates, generally, a reversible motor of any suitable type to be driven by liquid under pressure and operatively connected in any suitable manner with the wheels of the vehicle A to drive said wheels and thereby drive the vehicle.

Associated with the pump C and the motor D is an expansible and contractible high pressure liquid chamber $a$ and an expansible and contractible liquid reservoir chamber $b$.

In the present instance the chambers $a$ and $b$ are comprised by cylinders 10 and 11, respectively, each closed at least at one end and having therein fluid-tightly slidable pistons 12 and 13, respectively, the chamber $a$ being comprised by the part of the cylinder 10 between one closed end thereof and its related piston 12, and the chamber $b$ being comprised by the part of the cylinder 11 between one closed end thereof and the related piston 13. The other ends of the cylinders 10 and 11 may be open or closed as desired. In any event, said cylinders 10 and 11 are provided at their said other ends or at other suitable points with closure caps or other suitable abutments 14 and 15, respectively, from which coil springs 16 and 17 react upon the pistons 12 and 13, respectively, to tend constantly to move said pistons in said cylinders in directions to contract the chambers $a$ and $b$.

The outlet of the pump C is connected with the chamber $a$ by a pipe 18 having interposed therein a check valve 19 which opens toward said chamber $a$ whereby fluid delivered by the pump C is free to enter the chamber $a$, but is prevented from returning to the pump from said chamber through said pipe 18.

The motor D has two ports 20 and 21 through which liquid may be circulated in either direction through the motor to operate the same in either direction. In this connection it may be assumed in the present instance that liquid supplied to the motor D through the port 20 and exhausted therefrom through the port 21 effects operation of said motor in a direction to impart forward motion to the vehicle A, and that liquid supplied to said motor through the port 21 and exhausted therefrom through the port 20 effects operation of said motor in a direction to impart reverse or backward movement to the vehicle A.

The ports 20 and 21 are connected with the pipe 18 and, consequently, with the pump C and the chamber $a$ by pipes 22 and 23, respectively; the inlet of the pump C is connected with the pipe 18 by a pipe 24; the pipe 22 is connected with the pipe 24 by a pipe 25, and the pipe 23 is connected with the pipe 24 by a pipe 26 a branch 27 of which is connected with the chamber $b$.

At the junction of the pipes 22 and 25 is a throttle valve 28 of any suitable type which is manually operable by any suitable means, such as a foot pedal or hand lever as indicated at 29, to establish communication between the outlet of the pump C and the port 20 of the motor D through the pipes 18 and 22 while simultaneously denying communication between the pipe 22 and the inlet of the pump through the pipe 25, or to establish communication between port 20 of the motor D and the inlet of the pump C through the pipes 22 and 25 while simultaneously denying communication between the outlet of the pump C and said motor port 20.

At the junction of the pipes 23 and 26 is a throttle valve 30 of any suitable type which is manually operable by any suitable means, such as a foot pedal or hand lever as indicated at 31, to establish communication between the port 21 of the motor D and the inlet of the pump C through the said pipes 23 and 26 while simultaneously denying communication between the pipe 18 and the said motor port 21, or to establish communication between the pipe 18 and the said motor port 21 through the pipe 23 while simultaneously denying communication between said pipe 23 and the pipe 26.

The check valve 19 is arranged in the pipe 18 between the points of connection with said pipe 18 of the pipes 22 and 24. Another check valve 32 is arranged in the pipe 25 and opens toward the pipe 24, and another check valve 33 is arranged in the pipe 26 and also opens toward the pipe 24.

In the pipe 24 is a valve 34 which is operable to establish and to deny communication through said pipe 24 between the pipe 18 and the inlet of the pump C. Normally this valve 34 has a position denying communication between the pipe 18 and the pump inlet, but there is a suitable connection 35 between said valve and the chamber $a$ whereby said valve is actuated to establish communication between the pipe 18 and the pump inlet in response to the pressure in said chamber $a$ rising to or exceeding a predetermined value.

In the connection 35 there preferably is provided a suitable yieldable means, indicated conventionally and designated as 36, to insure a gradual actuation of the valve 34 by rise of pressure in the chamber $a$ to a predetermined value. Preferably, too, there is provided a suitable means, such as a hand lever or foot pedal 37 operatively connected with the valve 34 whereby said valve may be actuated manually to establish communication through the pipe 24 between the pipe 18 and the pump inlet.

In the connections between the hand levers or foot pedals 29 and 31 and the valves 28 and 30, respectively, preferably are provided suitable yieldable means, indicated conventionally and designated as 38, to insure gradual actuation of said valves 28 and 30 by said hand levers or foot pedals.

The valves 28 and 30 not only are operable to the two positions heretofore stated, but to intermediate positions in which they normally are disposed and in which they respectively deny any communication therethrough between the pipes which they control.

The spring 16 is sufficiently strong so that, when compressed, it acts through the piston 12 to impose on liquid contained in the chamber $a$ a pressure sufficiently high to cause the liquid, when supplied from said chamber to the motor D, to operate said motor to move the vehicle. On the other hand, the spring 17 is comparatively weak, being only sufficiently strong to maintain the system filled with liquid from the reservoir chamber $b$.

The operation of the system, assuming to begin with that the vehicle is at rest, that the valves 28 and 30 are in their normal positions denying communication therethrough between the pipes which they control, that the chamber $a$ is contracted and that the chamber $b$ is expanded and contains a reserve of liquid, is as follows:

The valve 34 is manually actuated to establish communication between the pump outlet and inlet through the pipes 18 and 24 so that the liquid in the system is circulated only through the pump, thereby to permit the pump to operate without developing pressure and to enable easier starting of the engine B than would be possible if the pump, upon initiation of operation thereof, immediately began to develop pressure.

The engine B then is started. The valve 34 then is returned to its normal position denying communication between the pipe 18 and the pump inlet through the pipe 24 and the engine is brought up to a speed such that it operates the pump C to deliver liquid through the pipe 18 to the chamber $a$ at a desired operating pressure at least as great as the pressure which is exerted by the spring 16 when said spring is compressed. When this engine speed is attained it may be assumed that thereafter the engine is operated constantly at such speed. Operation of the pump C results in liquid being delivered through the pipe 18 to the chamber $a$ and in expansion of said chamber against the force of the spring 16, liquid to compensate for the liquid delivered to the chamber $a$ flowing to the low pressure side of the pump C from the chamber $b$ through the pipes 27 and 24. Upon filling of the chamber $a$ with liquid, continued operation of the pump results in an increase in pressure in said chamber and in consequent operation of the connection 35 to open the valve 34. Thereafter, and until the valves 28 and 30 are actuated, the liquid circulates in a closed circuit through the pipes 18 and 24 and the valve 34, and the chamber $a$ is maintained filled with liquid under a pressure equivalent to the force exerted by the spring 16. If, then, the valve 28 is actuated to establish communication of the delivery side of the pump C and the chamber $a$ with the port 20 of the motor D, and the valve 30 is actuated to establish communication between the pipes 23 and 26, as illustrated in Fig. 1 of the drawing, liquid is delivered from the chamber $a$ and the pump C through the pipes 18 and 22 and valve 28 to the port 20 of the motor D and flows from the port 21 of said motor through the pipe 23, the valve 30 and the pipes 26 and 24 to the pump C. The motor D thereby is operated in a direction to impart forward motion to the vehicle. If, on the other hand, the valve 28 is actuated to cut off communication between the pipe 18 and the port 20 of the motor D and to establish communication between said port 20 and the inlet of the pump C through the pipes 22, 25 and 24, and if the valve 30 is actuated to cut off communication between the pipes 23 and 26 and to establish communication between the pipes 18 and 23, liquid is delivered from the chamber a and the pump C through the pipes 18 and 23 to the port 21 of the motor D, and flows from the port 20 of said motor through the pipe 22, the valve 28 and the pipes 25 and 24 to the inlet of the pump C. The motor D thereby is operated in a direction to impart reverse or backward movement to the vehicle. In either case, the amount of opening of the valves 28 and 30 determines, of course, the speed at which the vehicle will be moved. As liquid flows from the chamber a to the motor D, the pump C supplies liquid to said chamber a, thereby maintaining a circulation of liquid through the motor D and maintaining said motor in operation. In this connection it will be apparent that, due to the expansible chamber a, smooth starting of the vehicle is assured without recourse to change in speed of the engine B. Also, it will be apparent that, due to the chamber a, subsequent smooth operation of the vehicle will be assured despite slight variations in resistance to movement of the vehicle, because the chamber a acts expansively to absorb excess pressure developed by the pump B when a high pressure is not required for operation of the vehicle, and contractively to furnish pressure for operation of the vehicle in any instance where the pressure developed by the pump C is momentarily insufficient. In other words, the chamber a acts to compensate for fluctuations in pressure in the system and to maintain a substantially uniform operating pressure in the system under all ordinary conditions of operation of the vehicle at any given speed; also, to afford a reserve of liquid under pressure for vehicle starting and equivalent purposes. Of course, the speed of the engine B may be varied to vary the speed of the vehicle, but due to the chamber a the speed of the vehicle may be suddenly increased and decreased without changing the speed of the engine B. It will thus be apparent that the engine B may be of the Diesel type operating at constant speed under any given operating condition of the vehicle.

When the chamber a acts contractively to supply liquid to the motor D, liquid flows through the pipe 27 to the chamber b in an amount corresponding to the amount discharged from the chamber a, and when, subsequently, the chamber a again becomes filled with liquid, the spring 17 acts to contract the chamber b to return to the system from the chamber b an amount of liquid corresponding to the amount required to refill the chamber a. In other words, the chamber b serves as a compensating reservoir to maintain the system operatively filled with liquid.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:
1. A power plant comprising a power unit, a liquid pump connected with said power unit to be driven thereby, a liquid motor operatively connected with an element to be driven, said motor being reversible and having a pair of ports either for the inlet of liquid and the other for the outlet of liquid, an expansible and contractible chamber, yieldable means tending constantly to contract said chamber, pipe means connecting the outlet of said pump with said chamber and with both of the ports of said motor, pipe means connecting the inlet of said pump with both of the ports of said motor and also with the outlet of said pump, valves in said pipe means for directing liquid from the output of the pump to either of the ports of said motor and from the other port of said motor to the inlet of said pump, an expansible and contractible liquid reservoir, means tending constantly to contract said reservoir, a connection between said reservoir and the inlet of the pump, valve means for placing the outlet of the pump in direct communication with the inlet thereof and also for denying direct communication between the outlet and the inlet of the pump so as to require liquid supplied by the pump to flow to said chamber and said motor, manual means for actuating said last named valve means, and other means operable by a rise of the pressure in said chamber to a predetermined value to actuate said last named valve means to place the outlet of the pump in direct communication with the inlet thereof.

2. A power plant comprising a power unit, a liquid pump connected with said power unit to be driven thereby, a liquid motor operatively connected with an element to be driven, said motor being reversible and having a pair of ports either for the inlet of liquid and the other for the outlet of said liquid so that the motor may be operated in either direction depending upon the direction of flow of the liquid supplied thereto, an expansible and contractible chamber, yieldable means tending constantly to contract said chamber, a pipe connecting the outlet of said pump with said chamber, a first branch pipe connecting said first pipe with one of the ports of said motor, a second branch pipe connecting said first mentioned pipe to the other of the ports of said motor, a third branch pipe connecting said first mentioned pipe with the inlet of said pump, a first by-pass pipe connecting said first branch pipe with said third branch pipe, a second by-pass pipe connecting said second branch pipe with said third branch pipe, a valve at the junction of said first branch pipe and said first by-pass pipe operable to place said first branch pipe in communication with said first by-pass pipe and simultaneously to deny communication between said first mentioned pipe and the motor through said first branch pipe, said valve also being operable to establish communication between said first mentioned pipe and the motor through said first branch pipe and to simultaneously deny communication between said first branch pipe and said first by-pass pipe, a second valve at the junction of said second branch pipe and said second by-pass pipe operable to place said first mentioned pipe in communication with the motor through said second branch pipe and to simultaneously deny communication between said second branch pipe and said second by-pass pipe, said second valve also being operable to place said second branch pipe in communication with said second by-pass pipe and to simultaneously deny communication between said first mentioned pipe and the motor through said second branch pipe, a third valve in said third branch pipe operable to deny and also to establish communication between said first mentioned pipe and the inlet of the pump through said third branch pipe, means for manually operating said third valve, means operable in response to rise of the pressure in said chamber to a predetermined value to actuate said third valve to establish communication between said first mentioned pipe and the inlet of the pump through said third branch pipe, a liquid reservoir connected with said first by-pass pipe, a check valve in each by-pass pipe opening toward said third branch pipe, and a check valve in said first mentioned pipe, between the connections of said by-pass pipes therewith, opening toward said chamber.

HILTON W. CASEY.